J. W. DUNDAS.
TEA KETTLE.
APPLICATION FILED SEPT. 4, 1915.
1,197,464.
Patented Sept. 5, 1916.
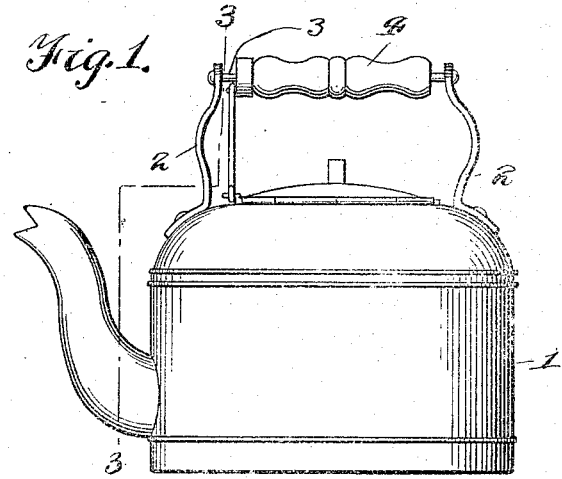
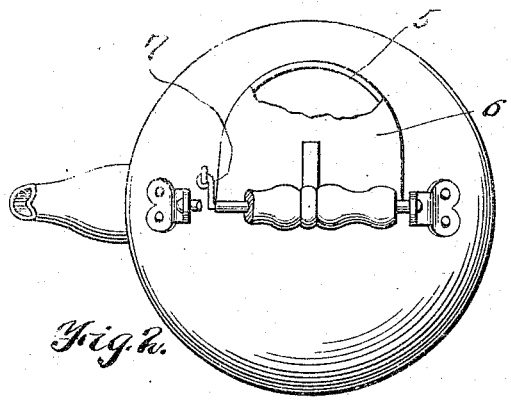
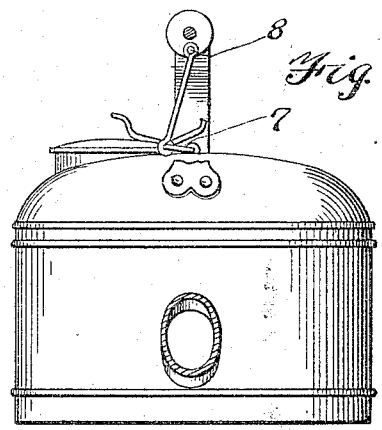
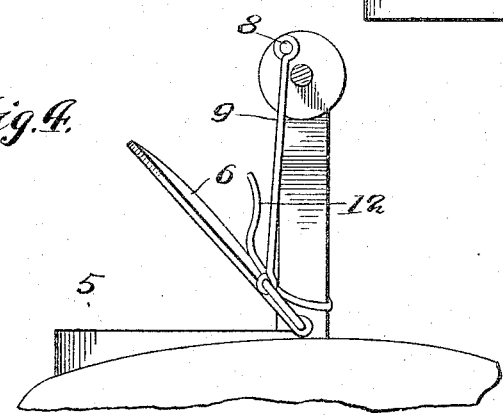
Inventor
James W. Dundas
Witnesses
By Victor J. Evans
Attorney

# UNITED STATES PATENT OFFICE.

JAMES W. DUNDAS, OF DETROIT, MICHIGAN.

TEA-KETTLE.

1,197,464.   Specification of Letters Patent.   Patented Sept. 5, 1916.

Application filed September 4, 1915.   Serial No. 49,032.

*To all whom it may concern:*

Be it known that I, JAMES W. DUNDAS, a citizen of the United States, residing at Detroit, in the county of Wayne and State of Michigan, have invented new and useful Improvements in Tea-Kettles, of which the following is a specification.

This invention relates to improvements in tea kettles and has particular application to a tea kettle lid and operating means therefor.

In carrying out the present invention, it is my purpose to provide a tea kettle wherein the inlet opening and the lid therefor will be so arranged relatively to the handle of the kettle as to enable the lid to be opened and the kettle held by the handle without exposing the hands to the steam vapor rising from the contents of the kettle.

It is also my purpose to provide a tea kettle wherein the lid may be readily and conveniently opened and closed and held in open position and wherein the component parts will be so arranged and correlated as to reduce the possibility of derangement to a minimum.

With the above and other objects in view, the invention consists in the construction, combination and arrangement of parts hereinafter set forth in and falling within the scope of the claim.

In the accompanying drawings:—Figure 1 is a view in side elevation of tea kettle constructed in accordance with the present invention. Fig. 2 is a top plan view of the tea kettle. Fig. 3 is a vertical sectional view through the tea kettle. Fig. 4 is a similar view taken at right angles to Fig. 3.

Referring now to the drawing in detail, 1 designates a tea kettle embodying top and bottom and side walls. Secured to the top wall of the tea kettle at diametrically opposite points and projecting upwardly therefrom are standards 2 disposed in parallelism and journaled in the upper ends of the standards 2 is a shaft 3, while fixed upon the shaft 3 between the standards 2 is a handle 4 composed of wood or other suitable material non-conductive of heat. Formed in the top of the tea kettle at one side of the center line thereof is a filling opening 5 and pivotally connected to the inner edge wall of the filling opening 5 is a cover 6 adapted to close the filling opening and capable of movement to uncover such opening. Formed on one end of the pivot rod of the cover 6 and projecting outwardly therefrom at right angles thereto is a crank arm 7 and connecting the crank arm 7 with a pin 8 carried by the adjacent end of the handle 4 is a link 9 whereby the cover may be raised when the handle is rotated in one direction and lowered when the direction of movement of the handle is reversed. Projecting upwardly from the upper surface of the cover is a finger piece 12 whereby the cover may be depressed whenever desired.

In practice, when the cover 6 is in closed position and it is desired to open the same, the handle 4 and shaft 3 are rotated in one direction or the other and in this rotation of the handle a pull is exerted through the link 9 upon the cover 6, thereby swinging the latter to open position. When the cover is swung to open position and the kettle lifted by the handle 4, it will be seen that the cover acts as a deflector so as to prevent the steam vapor rising from the contents of the kettle from contacting with the hand. When it is desired to close the cover the handle may be rotated in the reverse direction, or the finger piece 12 depressed.

I claim:—

A tea kettle having an inlet opening in the top thereof, standards uprising from the top at diametrically opposite points, a handle journaled in the upper ends of said standards and capable of rotary movement therein, a top closing said inlet opening and adapted for swinging movement, and a link having one end connected to said top and the other end connected to one extremity of said handle eccentrically thereof whereby the top may be swung to open position when the handle is rotated in one direction and swung to closed position when the handle is rotated in the other direction.

In testimony whereof I affix my signature in presence of two witnesses.

JAMES W. DUNDAS.

Witnesses:
CHAS. H. NORTHROP,
CHAS. W. HELMRICH.

Copies of this patent may be obtained for five cents each, by addressing the "Commissioner of Patents, Washington, D. C."